(12) United States Patent
Mathieu

(10) Patent No.: US 8,708,536 B1
(45) Date of Patent: Apr. 29, 2014

(54) OPTIC ASSEMBLY FOR MIRROR

(75) Inventor: Daniel J. Mathieu, Sheboygan Falls, WI (US)

(73) Assignee: K.W. Muth Company, Inc., Sheboygan, WI (US)

( * ) Notice: Subject to any disclaimer, the term of this patent is extended or adjusted under 35 U.S.C. 154(b) by 423 days.

(21) Appl. No.: 12/871,727

(22) Filed: Aug. 30, 2010

(51) Int. Cl.
  *B60Q 1/26* (2006.01)
(52) U.S. Cl.
  USPC .......................................... 362/494; 362/487
(58) Field of Classification Search
  USPC .......... 362/494, 487, 543–545, 297, 298, 346
  See application file for complete search history.

(56) References Cited

U.S. PATENT DOCUMENTS

| | | | |
|---|---|---|---|
| 5,361,190 A | 11/1994 | Roberts | |
| 5,373,280 A | 12/1994 | Louy et al. | |
| 5,788,357 A | 8/1998 | Muth | |
| 6,045,243 A | 4/2000 | Muth et al. | |
| 6,076,948 A | 6/2000 | Bukosky et al. | |
| 6,257,746 B1 | 7/2001 | Todd et al. | |
| 6,672,741 B1 | 1/2004 | Young | |
| 7,008,091 B2 | 3/2006 | Mathieu | |
| 7,241,037 B2 * | 7/2007 | Mathieu et al. | 362/494 |
| 7,246,921 B2 | 7/2007 | Jacobson et al. | |
| 7,273,307 B2 | 9/2007 | Mathieu | |
| 7,306,355 B2 | 12/2007 | Walser | |
| 7,520,636 B2 | 4/2009 | Van Der Poel | |
| 7,777,166 B2 | 8/2010 | Roberts | |
| 8,102,279 B2 * | 1/2012 | Foote et al. | 340/903 |
| 2005/0225994 A1 | 10/2005 | Rodriguez Barros et al. | |
| 2006/0012990 A1 * | 1/2006 | Walser et al. | 362/235 |
| 2008/0068520 A1 | 3/2008 | Minikey et al. | |
| 2009/0296417 A1 | 12/2009 | Luo et al. | |
| 2010/0182143 A1 | 7/2010 | Lynam | |

FOREIGN PATENT DOCUMENTS

WO  2010055178  5/2010

OTHER PUBLICATIONS

International Search Report mailed Feb. 8, 2013, for International application No. PCT/US12/66332.

* cited by examiner

*Primary Examiner* — Nimeshkumar Patel
*Assistant Examiner* — Christopher Raabe
(74) *Attorney, Agent, or Firm* — Jennifer L. Gregor; Godfrey & Kahn, S.C.

(57) ABSTRACT

An optic assembly has a reflector with a reflective surface, one or more light sources, and mask assembly with one or more apertures. Light rays from a light source are refocused and substantially converged before being emitted through one or more apertures in the mask assembly.

14 Claims, 10 Drawing Sheets

OPTIC ASSEMBLY FOR MIRROR

FIELD OF THE INVENTION

The present invention relates generally to the field of optic assemblies for use with mirrors or other semitransparent substrates, including, but not limited to, mirrors used as rearview mirrors. More particularly, the present invention relates to an improved optic assembly in which light rays from a light source are substantially refocused and a portion of those light rays are substantially converged before they are emitted through one or more apertures in the optic assembly.

BACKGROUND

Over the years, enhancements have been made to rearview mirrors for vehicles by using lights in conjunction with such mirrors to provide a number of lighted auxiliary features. For example, rearview mirrors can incorporate lighted auxiliary features including, but not limited to, turn signals, blind spot detection displays ("BSDDs"), hazard warning lights, brake lights, or parking assist lights. Rearview mirror enhancements such as these have safety benefits, and are desirable to vehicle drivers for a variety of reasons. But there are a number of challenges to designing an optimal, efficient, and cost effective lighting assembly for such applications.

The challenges presented in this field generally relate to the small space constraints within the housing of the rearview mirror and the functionality of the mirror itself and the lighted auxiliary features. Specifically, lighting assemblies used for such features must be sized to fit behind the mirror, but within the mirror housing. The lighting assemblies must also be small and limit mirror vibration. A variety of light sources can be used, but light-emitting diodes ("LEDs") are a common light source because they are small and generate large amounts of light, with lower energy consumption and heat generation, relative to their size. Any type of lights, however, generate heat and use energy. Thus, it is desirable to use as few lights or LEDs as possible to avoid excess heat and energy use. One additional aspect of designing lighted displays for rearview mirrors is that the visible light emitted from lighted auxiliary features should be sufficiently outside of or inside of the vehicle operator's line of sight during regular vehicle operation to avoid interfering with or to augment safe operation of the vehicle.

Early lighted auxiliary features for rearview mirrors were accomplished by using a simple "tilted LED" design, such as that disclosed in U.S. Pat. No. 6,257,746. In an embodiment of the tilted LED design, the lighting assembly is comprised of lights, such as LEDs, mounted on a substrate. The lights are positioned in an oblique orientation relative to the mirror, that is, they are "titled" away from the vehicle operator's line of sight and are not pointing directly through the mirror. The tilted LED design also uses a light diverting substrate which substantially prevents the lighting assembly from being visible when the lights are unlit. In this design, one LED or light is required for each aperture through which light passes out of the mirror. Although this design is still currently used, the lighting assembly in this design uses multiple LEDs and therefore a substantial amount of energy and also takes up a relatively substantial space.

As an alternative to the tilted LED design, optic assemblies have also been used to provide the lighting assembly for lighted auxiliary features in rearview mirrors. One early type of optic assembly is disclosed in U.S. Pat. No. 6,045,243, which is an example of the "Fresnel and deviator" design. The Fresnel and deviator optic design uses two or more optical elements to substantially converge and redirect light from light sources through the mirror in a way that does not interfere with the line of sight of the vehicle driver. In this design, the light emitting portion of the light source is either positioned facing the mirror or obliquely thereto. Light from the light source is first substantially collected and converged by a lens which may have refracting portions, reflective portions, or both. The collected light rays are then diverted by an optical element or elements (i.e., the "deviator") by a certain amount, for example, 20-40 degrees from a line positioned normal to the front surface of the mirror, so that the light which is ultimately utilized by the lighted auxiliary feature and ultimately passed through the mirror does not interfere with the lines of sight of the vehicle operator. The Fresnel and deviator design may use a variety of different light sources, ranging from LEDs to light bulbs, but this design requires a relatively large amount of light and therefore uses a large amount of energy, emits a relatively large amount of heat and uses a relatively large amount of space.

Another type of optic assembly used is the "Paralocs" design that is disclosed in U.S. Pat. No. 6,076,948, and other patents. "Paralocs" is an abbreviation for Parabolic Array of LEDs on a Cut-Out Substrate. In the Paralocs design, the light sources used, typically LEDs, generally face away from the mirror, unlike the Fresnel and deviator design in which the light sources face the mirror. In the Paralocs design, light from the light source is substantially converged and directed at the same time with the use of a parabolic-shaped reflector. This design usually uses one reflector for each light source. Planar redirecting facets have also been used to increase efficiency and uniformity on Paralocs optics. This type of faceting redirects light that has already been significantly converged by another part of the optic. This allows the optic designer to use light from the far side of the LED, which would ordinarily be unused. However, the Paralocs design still requires one LED or light source per aperture through which light is emitted, and one reflector facet per LED or light source, and therefore still has some of the disadvantages of the earlier optical techniques.

Another type of optic used is referred to as a "Half Optic," and is described in U.S. Pat. No. 7,273,307. An example of this type of optic uses a small reflector to direct and converge light from a light source through an aperture. The light source in the Half Optic design faces the mirror and is also positioned quite close to the mirror. This design has special utility when trying to direct light at angles very close to the mirror surface, but has some of the same disadvantages regarding the number of LEDs or light sources required, and permits less sophisticated control over the direction of the light rays through the aperture.

While the aforementioned designs provide ways to accomplish a number of lighted auxiliary features in rearview mirrors, the aspects of size, cost, and efficiency of the light assemblies used still have not been fully optimized. As such, there remains a need for a lighting assembly that will reduce the cost and size of lighted auxiliary features in rearview mirrors. The optic assembly for mirrors of the present invention addresses many of these problems. When utilizing the techniques described herein, the optic assembly of the present invention will allow using as little as one LED for lighted auxiliary displays that previously required 4 to 9 LEDs. It will also allow a significant reduction in assembly size, as well as a significant reduction in power consumption and generation of heat.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiments, and will be readily apparent to those skilled in the art. Such objects, features, benefits and advantages will be apparent from the above as taken in conjunction with the accompanying figures and all reasonable inferences to be drawn therefrom.

SUMMARY OF THE INVENTION

The optic assembly of the present invention has a reflector with a reflective surface, one or more light sources, and a mask assembly. The mask assembly has one or more apertures through which light can pass. The mask assembly generally covers the reflector and one or more light sources are generally enclosed within the optic assembly between the mask assembly and the reflective surface of the reflector. Light rays from one or more light sources are substantially refocused and a portion of those light rays are substantially converged by facets on the reflective surface of the reflector so that light rays are emitted through one or more apertures in the mask assembly. These and other features and advantages in accordance with this invention are described in, or are apparent from, the following description and accompanying Figures.

DETAILED DESCRIPTION

Figure 1:
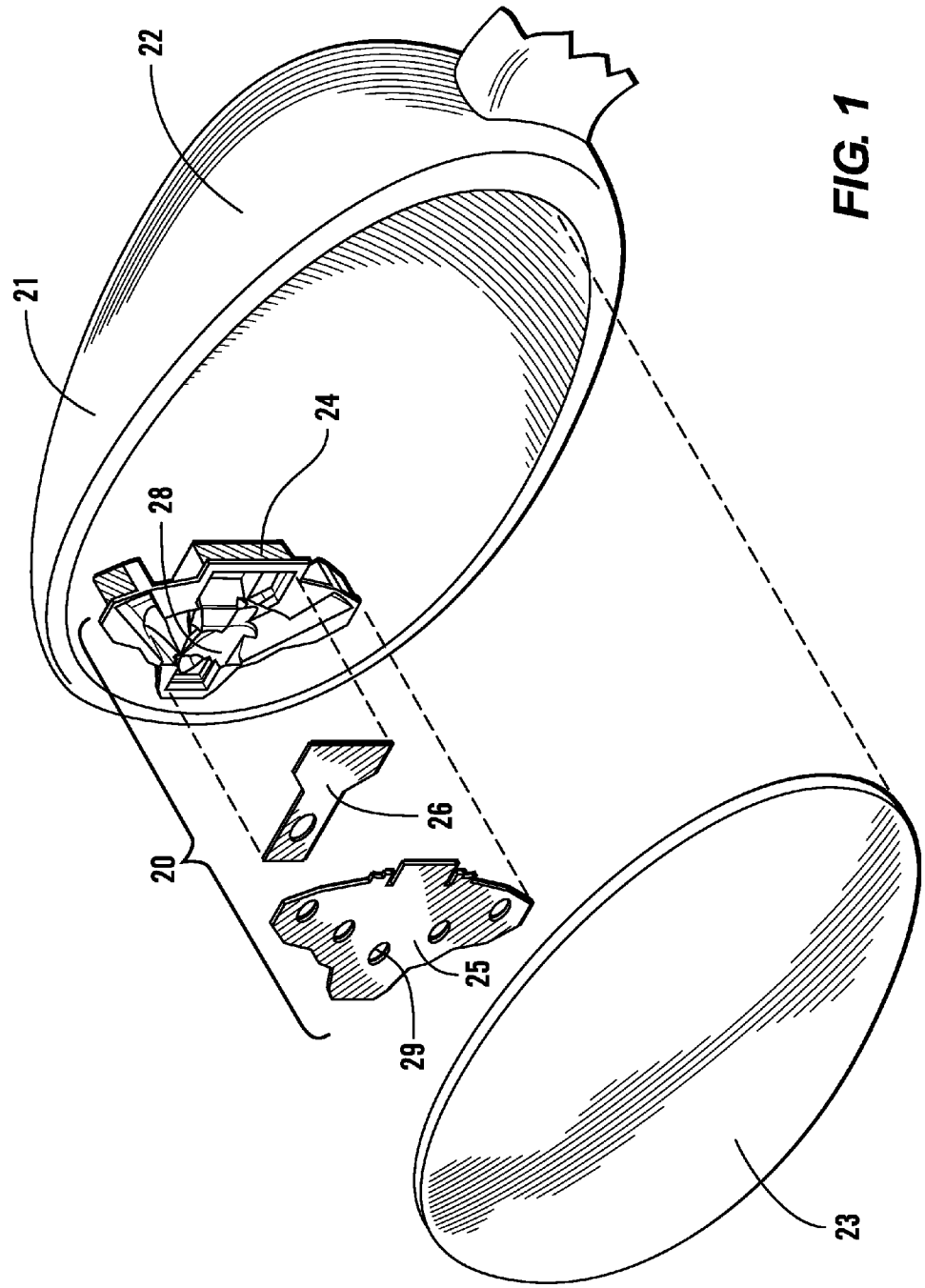
FIG. 1 is an exploded isometric view of a rearview mirror assembly showing the optic assembly for a lighted turn signal auxiliary feature in accordance with the present invention.

Referring to the Figures, the optic assembly 20 shown in FIG. 1 is designed to be used in connection with a rearview mirror assembly 21 for a vehicle. The optic assembly 20 is positioned inside of a housing 22 for a rearview mirror assembly, and is attached to a mirror 23, on the inside surface of the mirror. The optic assembly 20 shown is comprised of a reflector 24, a mask assembly 25, and one or more light sources. Suitable light sources may include a variety of light bulbs, assemblies, or light emitters. LEDs are a preferred light source, however, because of their relatively small size, low heat emission, and low power consumption. One or more LEDs may be electrically connected to a circuit board 26. The light source or light sources are generally enclosed inside the optic assembly 20.

The optic assembly 20 in FIG. 1 is shown in use with a mirror, but the optic assembly 20 could also be used with transparent or semitransparent substrates in other applications. When used with a mirror, the mirror could be coated with a variety of mirror coatings, including, but not limited to, a thin chrome coating as described in U.S. Pat. No. 6,045,243, laser ablated chrome, dichroic, silver, or an electrochromic mirror coating. Similarly, a variety of mounting adhesives may be used for attaching the optic assembly 20 to the inside surface of the mirror 23. One such adhesive could be an acrylic such as 9495 MP sold by 3M.

The mask assembly 25 of the optic assembly 20 shown in FIG. 1 generally covers the reflector 24 and circuit board 26 of the optic assembly, and is mounted to the mirror 23. The mask assembly 25 comprises a substrate that defines one or more apertures 29 through which light is emitted from the optic assembly 20 and ultimately through the mirror 23 or other semitransparent substrate. The mask assembly 25 has an outside surface 31 and an inside surface 32. The outside surface 31 of the mask assembly defines part of the exterior of the optic assembly 20, and may be adhered to a mirror 23, or other transparent or semitransparent substrate. The inside surface 32 of the mask assembly 25 faces the reflective surface 28 of the reflector 24. Aside from apertures 29 from which the light is emitted to form the icon, the mask assembly 25 otherwise substantially encloses the light source and light rays inside the optic assembly 20.

Figure 2:
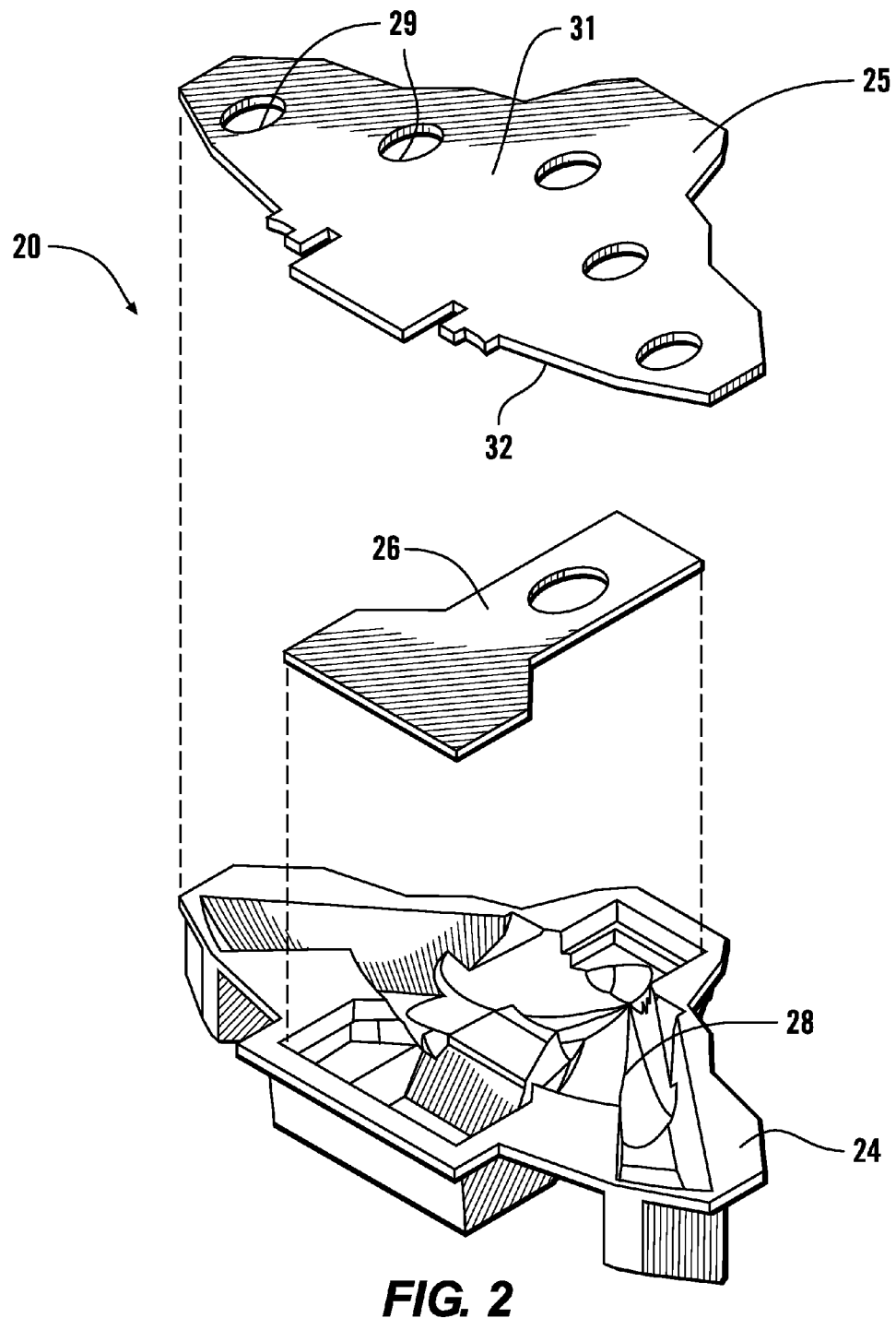
FIG. 2 is an exploded isometric view of the optic assembly of FIG. 1.
Figure 3:
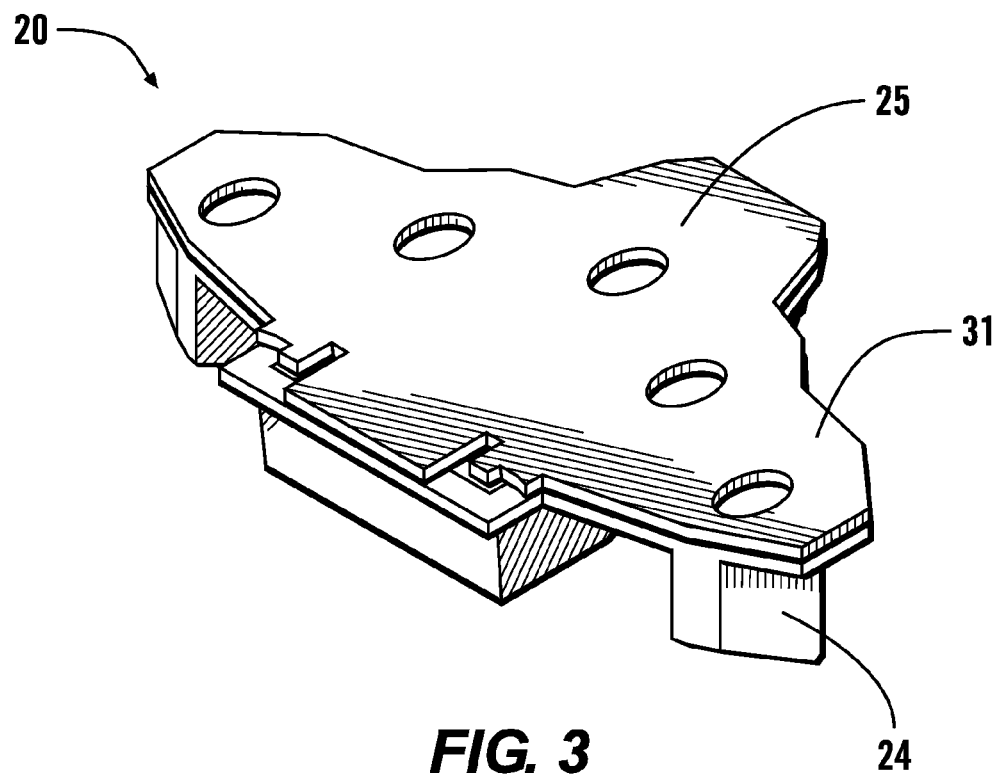
FIG. 3 is an isometric view of the optic assembly of FIG. 2.
Figure 4:
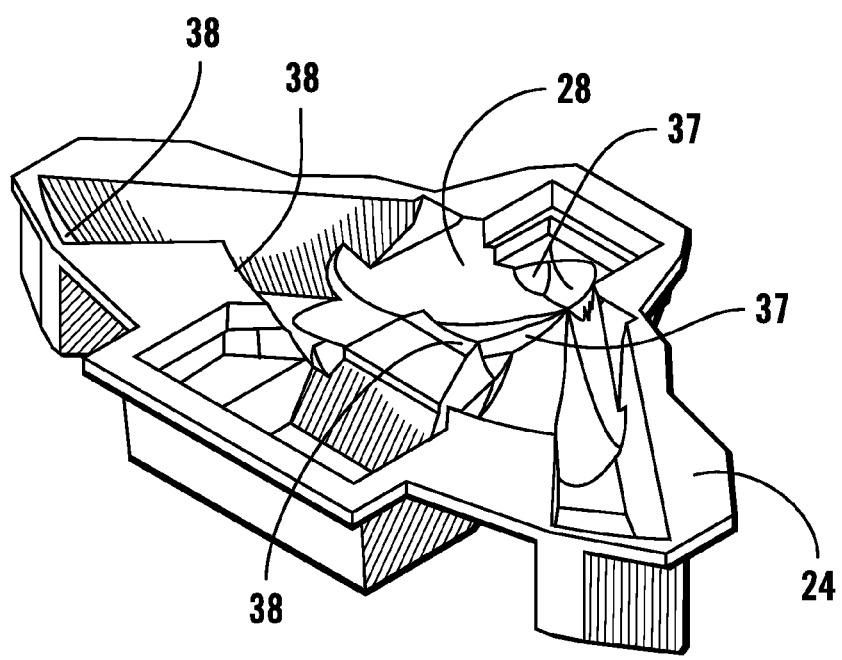
FIG. 4 is an isometric view of the optic assembly of FIG. 2, with the mask assembly and circuit board removed.

In the optic assembly shown in FIGS. 1-2, the mask assembly 25 is adhered to the reflector 24 with an adhesive, but the mating of the mask assembly 25 to the reflector 24 could be accomplished in any other suitable way, e.g., a screw connection. Additionally, a gasket 33 could be part of a mask assembly 25, or it could be an independent part. For example, a gasket that is part of the mask assembly could be used as part of the mask 36 itself, or the gasket could be formed by or integral with a circuit board 26. The gasket could also be positioned between the mask assembly 25 and the reflector 24. In FIGS. 1-3, a gasket is integral with the mask assembly 25. A gasket is not required for the invention but as a practical matter may save manufacturing or assembly costs by allowing a gasket to seal any irregularities in the mating surfaces. Although many materials may, of course, be used for a gasket, one material that could be used is a polyethylene foam with an acrylic adhesive such as 4492B sold by 3M. Alternatively, a circuit board or other item or items could be sandwiched at least partially between the mask assembly 25 and the reflector 24. And connectors such as screws or clamps could be used instead of adhesive to secure the position of the mask assembly 25 and the reflector 24 relative to each other. An embodiment including an optic assembly 20 with a gasket is shown in FIGS. 8-11.

The mask assembly 25 may also include a diffuser 34 to spread or scatter light. A diffuser 34 gives a lighted auxiliary feature a more uniform appearance and is often used on BSDDs. The diffuser could be the substrate upon which a mask is provided, and could comprise the inside surface 32 of the mask assembly. For example, a substantially opaque (except for the transparent portions that align with the apertures) mask could be screen printed onto the diffuser, which may be made from a polycarbonate material such as Bayer PCVM Velvet Matte Polycarbonate. An embodiment including a mask assembly 25 with a diffuser 34 is shown in FIGS. 8-11.

Figure 12:
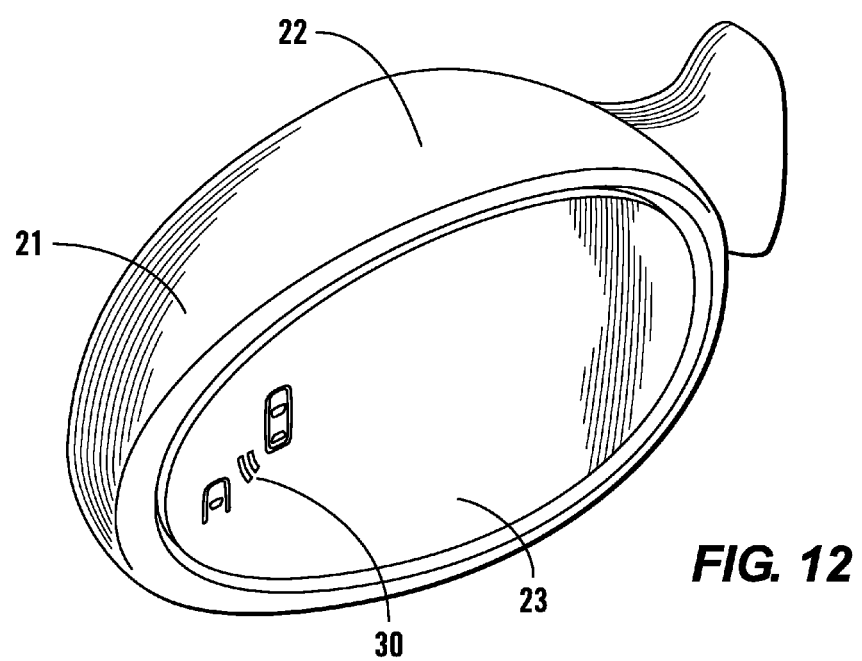
FIG. 12 is an environmental view of a mirror assembly in accordance with the present invention, which has an optic assembly used for a lighted BSDD auxiliary feature.
Figure 13:
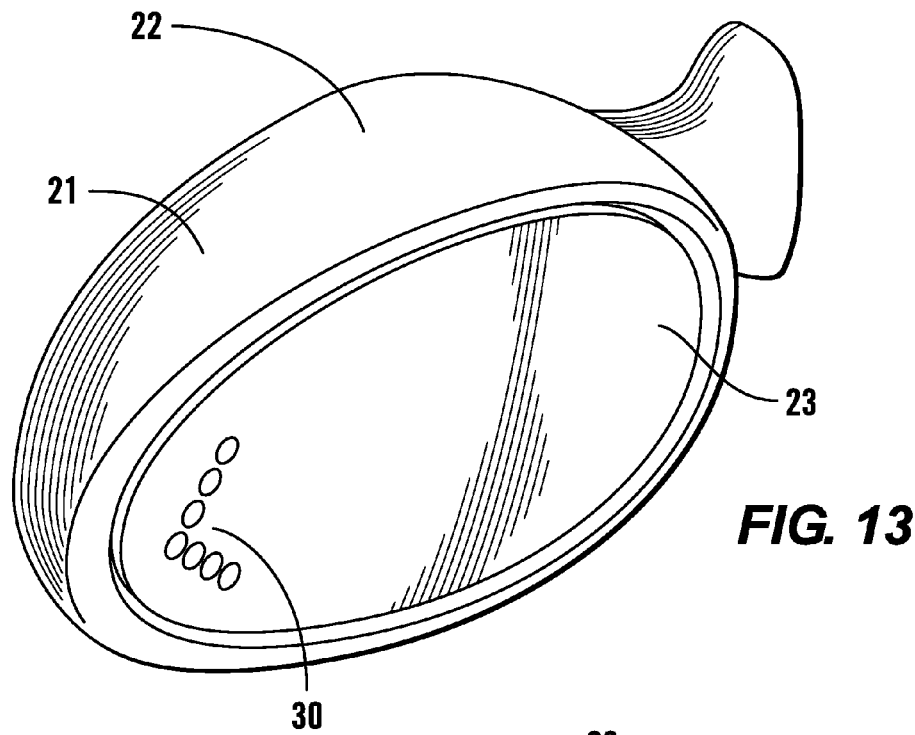
FIG. 13 is an environmental view of a mirror assembly in accordance with the present invention, which has an optic assembly used for a lighted turn signal auxiliary feature.
Figure 14:
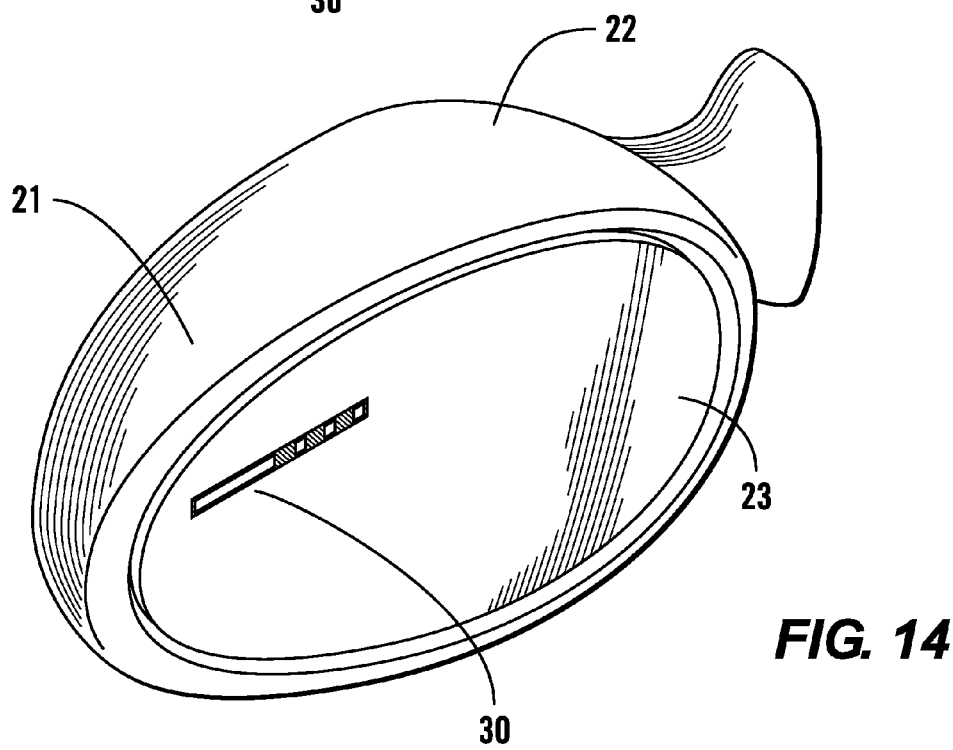
FIG. 14 is an environmental view of a mirror assembly in accordance with the present invention, which as an optic assembly used for a lighted parking assist display auxiliary feature.

The aperture 29 or apertures in the mask assembly 25 define the icon 30 for the lighted auxiliary feature. The icon 30 is the symbol displayed on or through the mirror or other substrate that is partially or wholly illuminated by light from the optic assembly 20. The icons used in lighted auxiliary features can of course vary greatly and can comprise an infinite number of lighted or partially lighted designs. FIGS. 12-14 show examples of icons that may be used in lighted auxiliary features. FIG. 12 shows an icon 30 that may be used, for example, for a lighted BSDD auxiliary feature. FIG. 13 shows an icon 30 that may be used, for example, for a lighted turn signal auxiliary feature. And FIG. 14 shows an icon 30 that may be used, for example, for a lighted parking assist display auxiliary feature.

The reflector 24 is typically made from a polycarbonate plastic polymer with a vacuum metalized finish with a topcoat, but any suitable material could be used. Some examples include: stamped or die cast metal, plastic with painted or printed-on reflective surfaces can be used, or plastic with inmolded reflective areas can be used. The reflector 24 is connected to or mated with the mask assembly 25. The reflective surface 28 of the reflector 24 faces the inside surface of the mask assembly 32 and is angled, flat, curved, or otherwise shaped to generally direct and orient at least some of the light rays emitted from the light source. These angles, flats, curves, or other shapes that form the topography of the reflective surface 28 of the reflector 24 shall be referred to herein as "facets." Facets can be shaped in any way that allows them to orient light, and may be planar, curved, smooth, rough, irregular, regular or any other shape or surfacing technique that reflects or manages light rays.

Refocusing facets 37 and converging facets 38 are two types of facets. Refocusing facets 37 direct light rays within the optic assembly. As used herein "refocusing" refers to directing light rays from the natural focal point of the light source towards another focal point. For example, light from an LED is generally directed from a focal point, and a refocusing facet reflects light rays from the LED toward a different focal point within the optic assembly. Converging facets 38 direct light from the inside of the optic assembly 20 to the outside of the optic assembly through an aperture 29 or apertures in the mask assembly 25. As used herein "converging" refers to collecting and orienting light rays in substantial alignment with each other so they generally form a beam. Converging facets may generally collimate light rays, which means that the light rays are oriented in a generally parallel direction in a beam. As a practical matter, and as known to those of ordinary skill in the art, it is impossible or nearly impossible to orient all the light rays in a perfectly parallel orientation, or in a perfectly converged orientation. Thus, converging facets and refocusing facets generally orient light rays in a desired direction, but it is not expected or required that this orientation be precisely converged or focused for each ray of light in a group of light rays.

The circuit board 26 is positioned at least partially between the mask assembly 25 and the reflector 24. The circuit board 26 is usually made of FR4 with 2 oz. copper but may be made of any suitable material. Light sources 35 for the optic assembly 20 will usually be electrically connected to a circuit board 26 but could also be powered by an alternative to a circuit board or from a location remote to the optic assembly 20. LEDs are commonly mounted on and powered by a circuit board 26, but a circuit board 26 could also be located remotely from one or more light sources. A circuit board 26 could be positioned in several different orientations in the optic assembly 20. For example, it may be positioned generally parallel to the mask assembly 25, so that a light source on the circuit board will essentially shine into the reflector 24. The circuit board 26 may also be positioned transversely or obliquely to the reflective surface 28. The orientation of the circuit board 26 and any associated light source with respect to the reflector can be varied depending on the desired lighted auxiliary feature or icon used and the space available. Additionally, the circuit board may have one or more pigtail connections, such that the circuit board 26 is pigtailed to the vehicle's control systems.

Figure 5:
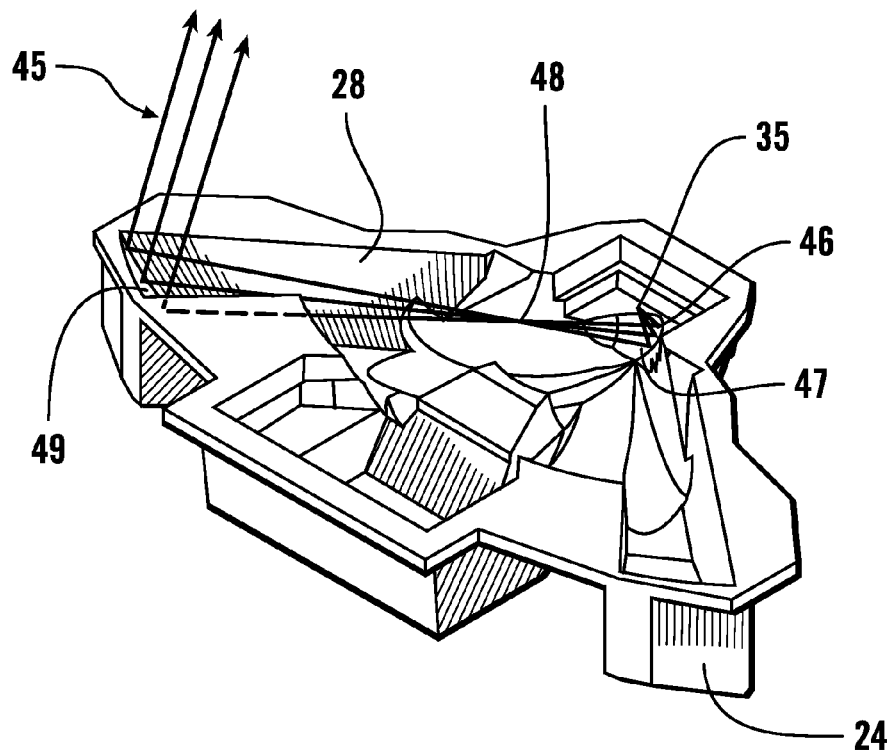
FIG. 5 is an isometric view of the reflector of the optic assembly of FIG. 2, showing light rays being directed by a first refocusing facet, through a first focusing point, and then being directed by a first converging facet.
Figure 6:
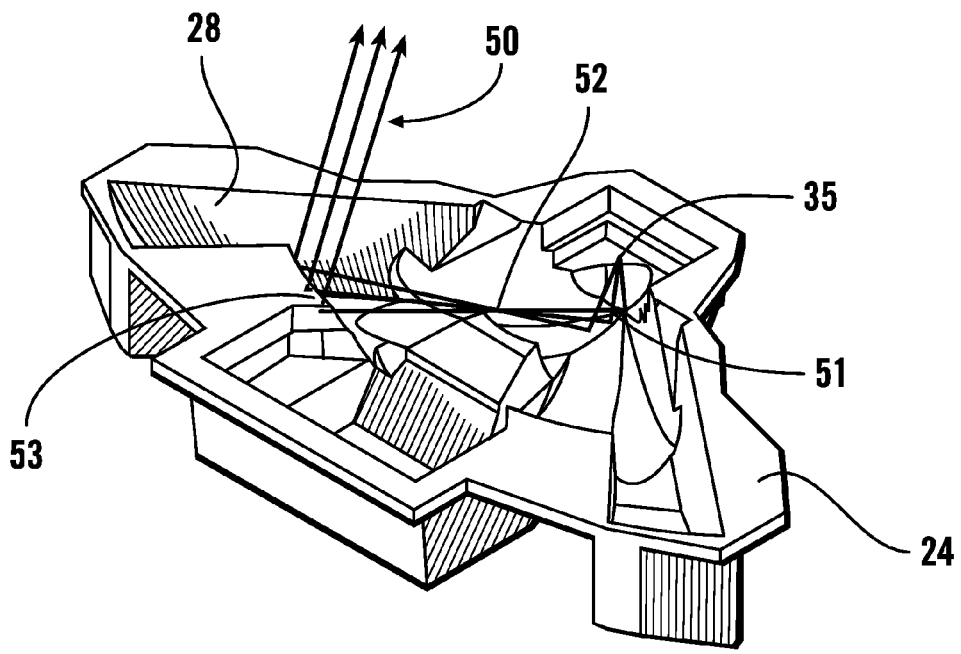
FIG. 6 is an isometric view of the reflector of the optic assembly of FIG. 2, showing light rays being directed by a second refocusing facet, through a second focusing point, and then being directed by a second converging facet.
Figure 7:
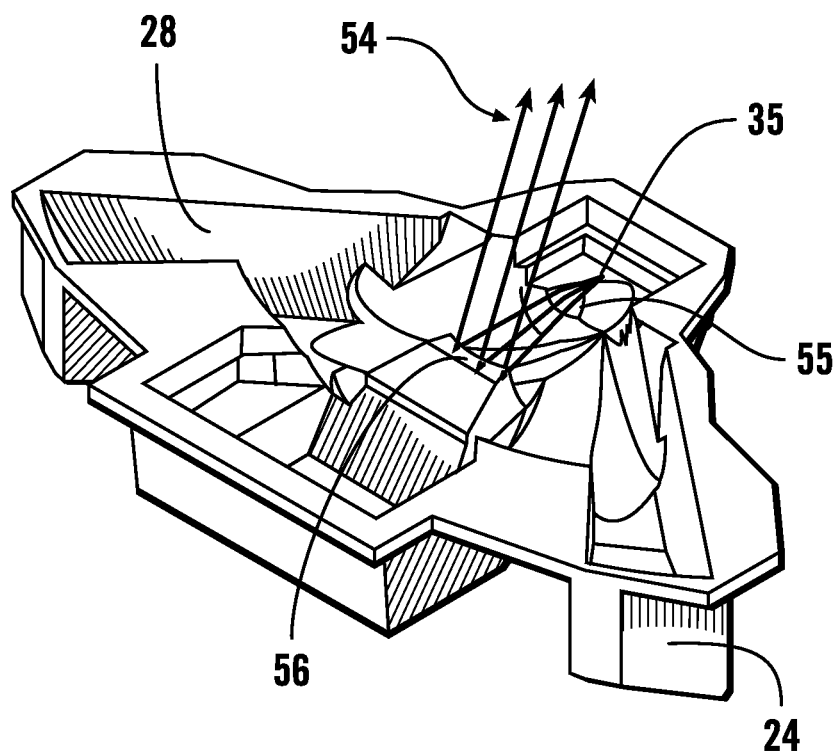
FIG. 7 is an isometric view of the reflector of the optic assembly of FIG. 2, showing light rays being directed by a third refocusing facet and a third converging facet.

For a description of how the reflector 24 functions, reference is made to FIGS. 5-7, which show the reflector 24 of the optic assembly 20 of FIG. 2. FIGS. 5-7 show how light rays 45 originating at a light source 35 are directed so that they are emitted through one or more apertures 29 in the mask assembly 25 and ultimately used in a lighted auxiliary feature. FIG. 5 shows a first set of light rays 46 directed by a first refocusing facet 47, through a first focusing point 48. Light rays from the first set of light rays 46 are directed through one or more apertures 29 by a first converging facet 49. The first refocusing facet 47 and the first converging facet 49 are reflective surfaces positioned to reflect at least a portion of the light rays emitted from the light source in a direction ultimately calculated to travel through a certain aperture in the mask assembly, or through a certain apertures in the mask assembly 25. At the first refocusing facet 47, a portion of light rays from a light source 35 are substantially refocused from the direction in which they are emitted from the light source. Since the light source generally points away from the mirror, light rays often must be substantially inverted in order to be directed to ultimately pass through the apertures in the mask assembly and through a mirror 23. Light rays directed by the first refocusing facet 47 meet generally at the first focusing point 48. The location and position of the first focusing point 48 is useful for calculating the dimensions, shaping, relative positioning, and other particulars for the first refocusing facet 47 and first converging facet 49. The precise positioning, shape, dimensions, and reflective/refocusing/converging characteristics of the various facets will vary depending on the design requirements and constraints associated with a particular design and could be determined through routine engineering by a person of ordinary skill in the art.

FIG. 6 shows a second set of light rays 50 emanating from the same light source 35 in FIG. 5, where the second set of light rays 50 are directed so that they are emitted through a different aperture 29 or apertures in the mask assembly 25. The second set of light rays 50 shown in FIG. 6 are directed by a second refocusing facet 51, through a second focusing point 52. Rays from the second set of light rays 50 are directed through one or more apertures 29 by a second converging facet 53. Like the first refocusing facet 47 and first converging facet 49, the second refocusing facet 51 and second converging facet 53 are positioned relative to each other and in the reflector 24 to orient the desired amount of light through the desired aperture or apertures. And the location and position for the second focusing point 52 may be used for calculating shaping, relative positioning and other particulars of the facets.

A focusing point between a refocusing facet and a converging facet is not necessarily required, however, and as shown in FIG. 7, depending on the configuration of a particular design, may not be needed. A focusing point may not be needed where the distance between the refocusing facet and the converging facet is relatively short, but other dimensional considerations may also give rise to situations where a focusing point is not necessary. FIG. 7 shows a third set of light rays 54 emanating from the same light source 35 in FIGS. 5 and 6, where the third set of light rays are emitted through a different aperture 29 or apertures than the first set of light rays and the second set of light rays. The third set of light rays 54 are directed by a third refocusing facet 55. Rays from the third set of light rays 54 are substantially directed through the desired aperture or apertures 29 by a third converging facet 56. FIGS. 5-7 show an example using three sets of light rays, but the same light management techniques will be used to direct light rays from the light source through all of the desired apertures in the mask assembly.

The above described double-bounce light management allows improved design flexibility in that the light rays can be redirected across the axis of the LED or in another desirable direction in order to keep the optic assembly as small as possible. This helps to fit optic assemblies on smaller mirrors and/or in smaller housings. In FIGS. 5-7 light is managed from the light source by first substantially refocusing and then substantially converging light rays, but the order of this "double bounce" can also be reversed, so that light rays are substantially converged and then refocused. This reversed double-bounce can be useful for achieving a shallow ray exit angle from a mirror.

The above described design will allow lighted auxiliary features to be accomplished with as little as 1 LED or light source, when such designs previously required many more LEDs. Using prior technology, for example, the icon 30 shown in FIG. 13 would require 7 individual LEDs. The above described design also allows the optic assembly 20 to be significantly smaller than prior art optic assemblies. This design will also reduce power consumption and therefore heat emission.

Figure 8:
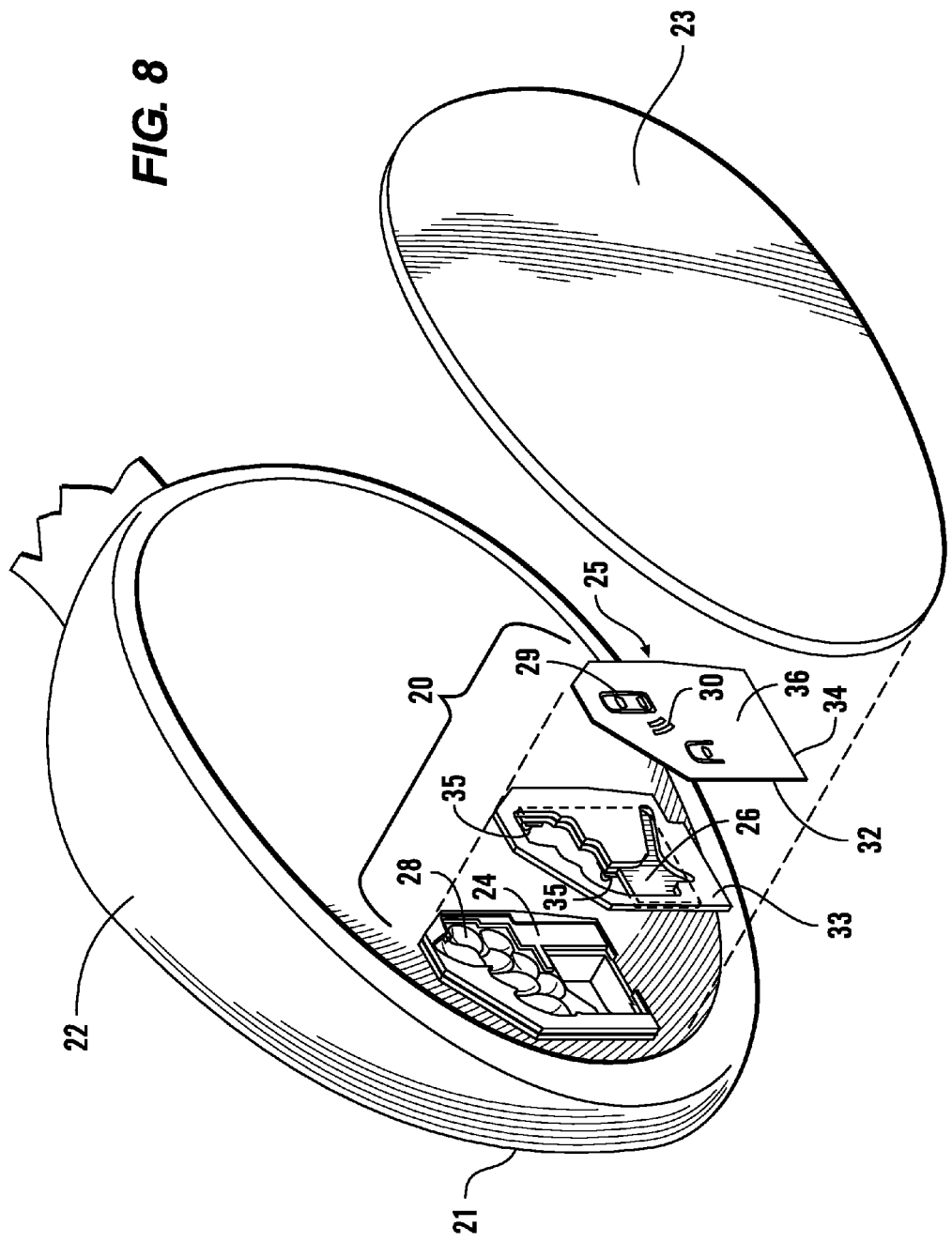
FIG. 8 is an exploded isometric view of a rearview mirror assembly showing the optic assembly for a lighted BSDD auxiliary feature in accordance with the present invention.
Figure 9:
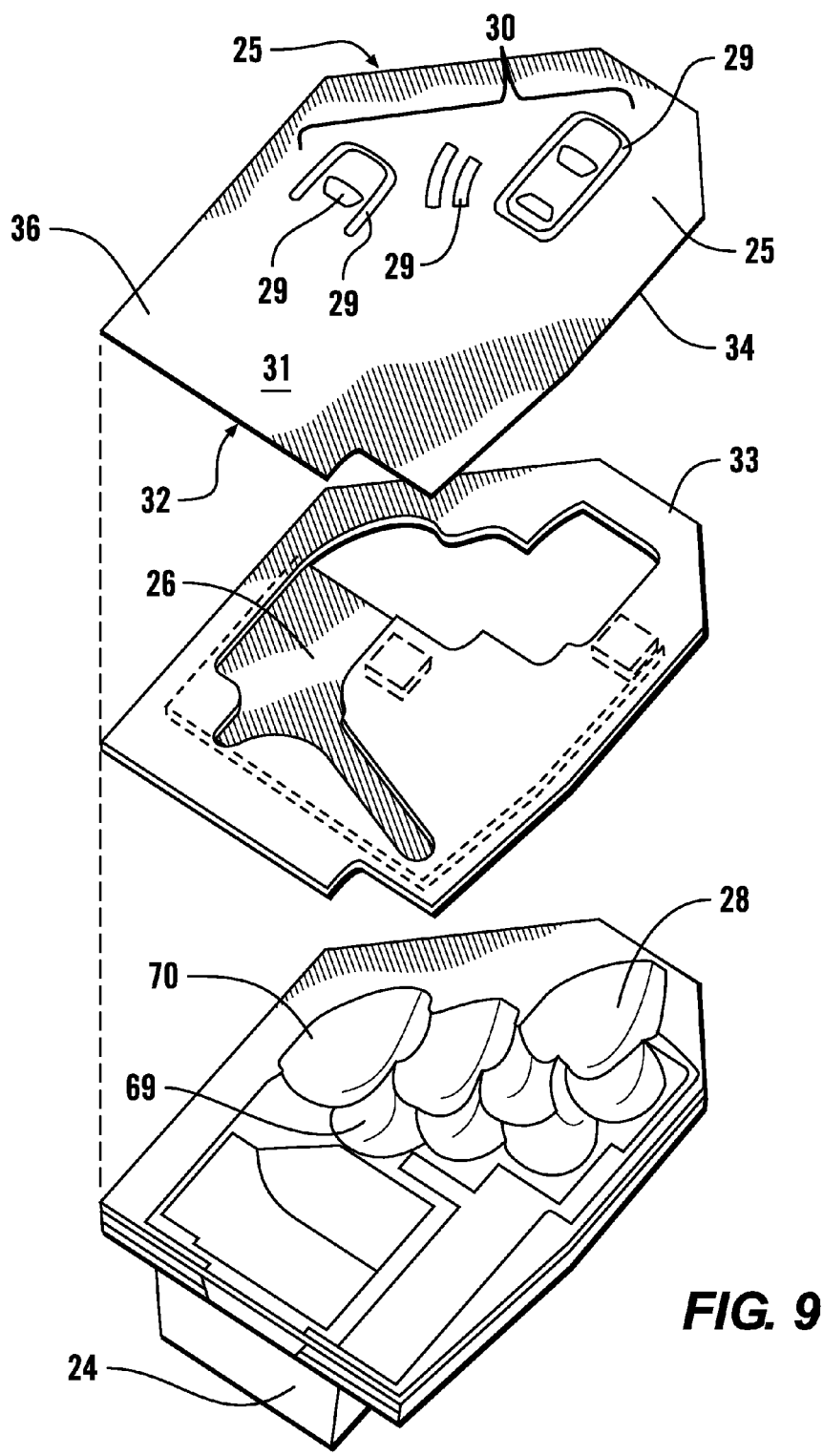
FIG. 9 is an exploded isometric view of the optic assembly of FIG. 8.
Figure 10:
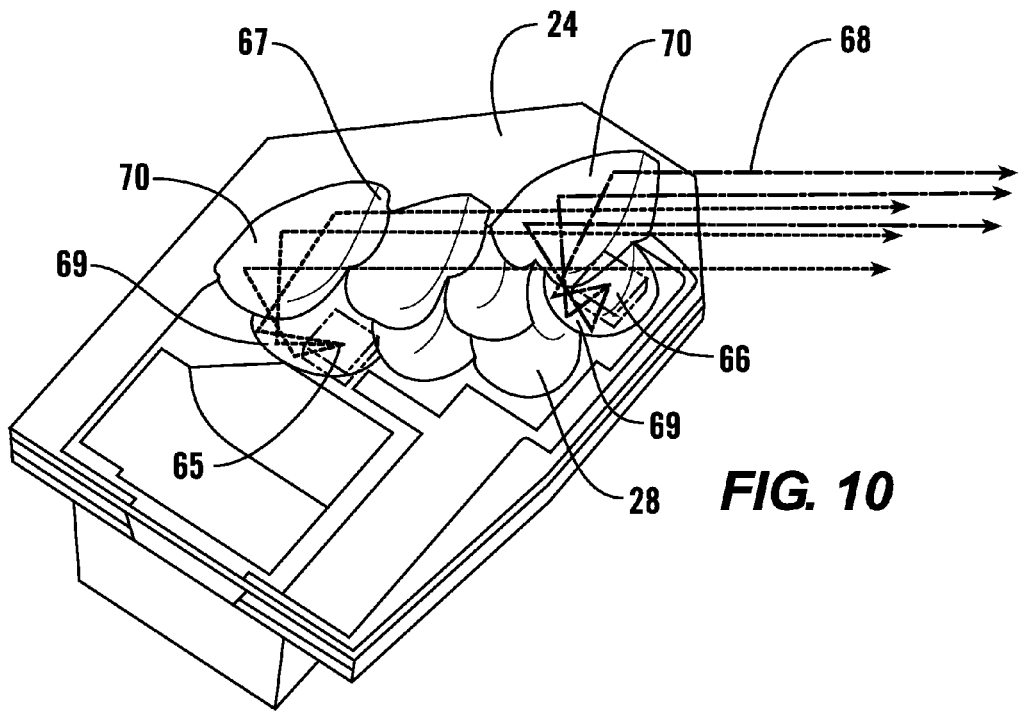
FIG. 10 is an isometric view of the reflector of the optic assembly of FIG. 9, showing light rays being directed by refocusing and converging facets.

Another embodiment in accordance with the present invention is illustrated in FIGS. 8-10, which shows an optic assembly 20 for a lighted BSDD auxiliary feature. In this embodiment, the reflector 24 is shown having a shape designed in accordance with the shape of the icon 30 for a BSDD. The reflective surface 28 is shaped and faceted to direct the light from two light sources 35, which are electrically connected to and controlled by a circuit board 26. The two light sources are preferably LEDs. The optic assembly 20 in this embodiment has a mask assembly 25 wherein the mask 36 is screen printed on a diffuser 34. The optic assembly 20 also has a gasket 33 positioned between the reflector 24 and the mask assembly 25. FIG. 9 shows the optic assembly 20 from the BSDD embodiment shown in FIG. 8. FIG. 10 shows the reflector 24 from the optic assembly 20 in FIG. 8.

Referring to FIG. 10, this drawing shows how the light from the light sources 35 is managed in this embodiment, in which 2 LEDs are used for light sources. The two LEDs comprise a first light source 65 and a second light source 66, respectively. Light rays from the first light source 67 and a second light source 66 are directed by BSDD refocusing facets 69. Light rays are then substantially aligned by BSDD converging facets 70, which direct a desired amount of light rays through one or more apertures 29 in the mask assembly 25. Light rays are directed through the apertures to illuminate the icon 30 or portions of the icon as desired.

Figure 11:
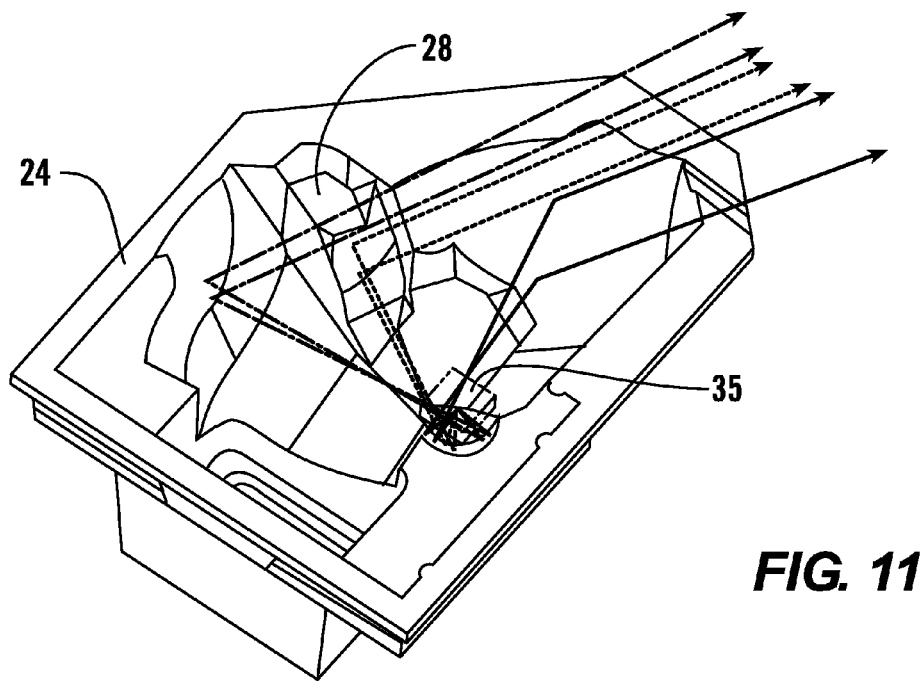
FIG. 11 is an isometric view of a reflector for an optic assembly for a lighted BSDD auxiliary feature showing compound faceting.

As explained previously, the reflective surface 28 of the reflector 24 in the present invention is angled, faceted, or otherwise shaped to direct and orient light rays emitted from the light source in various directions and ultimately through an aperture or apertures in the mask assembly. These topographic features are called facets herein. The faceting of the reflector 24 may be simple or it may be compound. Compound faceting refers to facets having multiple reflective surfaces, or in other words, faceted facets. An example of a reflector 24 with compound faceting is shown in FIG. 11. Contrasting FIGS. 10 and 11 illustrates the benefit of compound faceting, namely increased light management capabilities so that that fewer light sources or LEDs can be used, thereby reducing the size of the optic assembly 20. With simple faceting the BSDD optic assembly shown in FIG. 10 uses two light sources or LEDs, but when compound faceting is used to orient light rays in multiple directions, only one LED is required.

Despite having the ability to illuminate an icon using only 1 LED, there still may be circumstances and applications where using more than one LED is desirable. Depending on the icon or on the lighted auxiliary feature, it may be preferable to use more than one LED, for example, if an icon has subparts or sections. Different LEDs could be used to illuminate separate subparts or sections of the icon. Additionally, there may be other reasons for using more than one LED, as guided by the application and icon.

The optic assembly 20 can be manufactured readily using standard techniques, including, but not limited to the following: rotary die cutting for the gasket 33; steel rule die cutting for the mask assembly 25 and diffuser 34; screen printing for the mask assembly when the mask is printed on the diffuser 34; injection molding, vacuum forming, and/or stereo lithography for the reflector 24; standard surface mount circuit board manufacturing techniques, or through-hole circuit board techniques.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. An optic assembly for mounting behind a substrate, the optic assembly comprising:
   a mask assembly defining one or more apertures, the mask assembly being capable of being mounted behind the substrate;
   a reflector attached to the mask assembly and having a reflective surface, the reflective surface having a plurality of facets such that the facets are capable of reflecting light rays in a plurality of directions; the plurality of facets including one or more refocusing facets and one or more converging facets;
   one or more light sources substantially enclosed between the mask assembly and reflector; wherein light from the one or more light sources is directly received by one or more refocusing facets that first cause at least a portion of light rays from a light source to be directed from the natural focal point of the light source towards another focal point; and wherein at least a portion of the light rays that were first directed by the one or more refocusing facts is received by one or more converging facets that cause at least a portion of light rays to be directed through at least one aperture in the mask assembly.

2. The optic assembly of claim 1, wherein the substrate is a mirror.

3. The optic assembly of claim 1, wherein the mask assembly further comprises:
   a diffuser, the diffuser being capable of scattering light rays emitted from the one or more light sources; and
   a mask defining one or more apertures, the mask at least partially covering the diffuser such that the diffuser and mask substantially enclose an area between the reflector and the mask assembly.

4. The optic assembly of claim 1, wherein the one or more apertures form an icon.

5. The optic assembly of claim 1, wherein there is one or more refocusing facet and one or more converging facet for each aperture.

6. The optic assembly of claim 1, wherein there is at least one converging facet for each aperture.

7. The optic assembly of claim 1, wherein the refocusing facets are compound refocusing facets arrayed about one particular light source so as to create multiple refocusing points that are used in conjunction with multiple converging facets.

8. The optic assembly of claim 1, wherein the optic assembly has only one light source.

9. A method for directing light rays from a light source in an optic assembly comprising the steps of:
   providing one or more light sources capable of emitting light rays into a reflector, the reflector having a reflective surface having a plurality of facets;
   substantially refocusing light rays using a refocusing facet on the reflector, the refocusing facet capable of causing light rays received directly from the light source to be directed from the natural focal point of the light source towards another focal point;
   substantially converging at least a portion of the substantially refocused light rays using a converging facet on the reflector, the converging facet capable of causing at least a portion of light rays directed by a refocusing facet to be substantially aligned and directed through an aperture in the optic assembly, the aperture adjacent to a substrate.

10. The method of claim 9, wherein the substrate is a rearview mirror for a vehicle.

11. The method of claim 9 wherein the mask assembly further comprises a diffuser, the diffuser being capable of scattering light rays emitted from the one or more light sources.

12. The method of claim 9 wherein the optic assembly includes one or more apertures that form an icon.

13. The method of claim 9 wherein the reflective surface further comprises one or more compound refocusing facets arrayed about one particular light source so as to create multiple refocusing points that are used in conjunction with multiple converging facets.

14. The method of claim 9 wherein the optic assembly has only one light source.

\* \* \* \* \*